United States Patent
Rabodzei et al.

[11] 3,743,845
[45] July 3, 1973

[54] CLOSED-CIRCUIT TV INSPECTION X-RAY MICROSCOPE

[76] Inventors: Nikolai Vasilievich Rabodzei, Institutskaya ulitsa, 6a, kv. 39; Evgeny Mikhailovich Ljubimov, ulitsa Lenina, 14, kv. 21; Mikhail Nikolaevich Nadobnikov, ulitsa Voxalnaya, 21, kv. 7; Alexandr Alexandrovich Krokhin, ulitsa Tsentralnaya, 12, kv. 8, all of Fryazino Moskovskoi oblasti, U.S.S.R.

[22] Filed: Feb. 7, 1972

[21] Appl. No.: 224,043

Related U.S. Application Data

[63] Continuation of Ser. No. 90,268, Nov. 17, 1970, abandoned.

[52] U.S. Cl. ............................................. 250/360
[51] Int. Cl. ........................................... G01n 21/34
[58] Field of Search .................. 250/49.5 A, 49.5 B, 250/49.5 PE, 49.5 E, 50, 51.5, 53, 65 R; 178/6.8, DIG. 5

[56] References Cited
UNITED STATES PATENTS
2,877,353  3/1959  Newberry .......................... 250/49.5
3,364,353  1/1968  Fry et al. ............................. 250/50

OTHER PUBLICATIONS
"X-Ray Microscopy and Microradiography" by Cosslett et al., published by Academic Press, Inc., New York, 1957, page 371.

Primary Examiner—William F. Lindquist
Attorney—Waters, Roditi, Schwartz & Nissen

[57] ABSTRACT

A closed-circuit TV inspection X-ray microscope characterized in that means for moving the specimen inside a shielded specimen chamber includes the specimen-chamber wall which supports a specimen manipulator and which is movable in its own plane. The microscope is mainly intended to measure hidden flaws in small-size products having an opaque enclosure.

5 Claims, 3 Drawing Figures

Patented July 3, 1973          3,743,845

CLOSED-CIRCUIT TV INSPECTION X-RAY MICROSCOPE

This application is a continuation of Ser. No. 90,268, filed Nov. 17, 1970, now abandoned.

The present invention relates to instrumentation, and more specifically to closed-circuit TV inspection X-ray microscopes intended to measure hidden flaws in products having an opaque enclosure.

There exist closed-circuit TV industrial X-ray microscope comprising an X-ray source, a shielded specimen chamber, a means for coordinate movement of the specimen inside the specimen chamber, an X ray sensitive TV pick-up tube, and a TV monitor. The specimen chamber has a window to watch the position and travel of the specimen. The means for coordinate movement of the specimen in the cited microscope is a carriage riding rails laid inside the specimen chamber and giving support to a cradle-and-spindle assembly capable of moving in mutually perpendicular direction in a plane at right angles to the travel of the carriage and the X-ray beam. The spindle has a grip to clamp the specimen. All motions are actuated by a remotely controlled electric operating mechanism. This means for coordinate movement of the specimen does not make it possible to precisely measure products, especially those of small size, with the said microscope. Furthermore, owing to its large size, this means does not permit the specimen to be moved in very small increments, to be brought very closely to the target of the X ray sensitive TV pick-up tube, or this incremental travel to be measured precisely without a considerable elaboration of the entire system.

A particular object of the invention is to provide in a closed-circuit TV inspection X-ray microscope such means and devices that can provide for fine coordinate movement of a specimen inside the specimen chamber along two mutually perpendicular axes in a plane at right angles to the axis of X-rays, and also for precise aiming at the specimen, and for accurate measurement of its travel.

In accordance with this and other objects, the invention resides in that in a closed-circuit TV inspection X-ray microscope, according to the invention, the means for moving the specimen inside the specimen chamber includes the specimen-chamber wall which gives support to a specimen manipulator and is movable in its own plane.

It is preferable to make the movable wall in two parts, with the part giving support to the manipulator being capable of moving relative to the other part in the plane of the movable wall in a direction at right angles to the travel of the latter.

It is also preferable to make the manipulator capable of movement at right angles to the plane of the movable wall.

In order to measure the movements of a specimen, it is preferable to provide in the closed-circuit TV inspection X-ray microscope two mutually perpendicular scales, one scale being permanently affixed to the manipulator and the other located above the first being fabricated from a transparent material and attached to the movable wall. The scales can be read with the aid of an optical device permanently affixed to the said movable part of the movable wall.

The invention will be more fully understood from the following description of preferred embodiments taken in connection with the accompanying drawings wherein.

Figure 1:
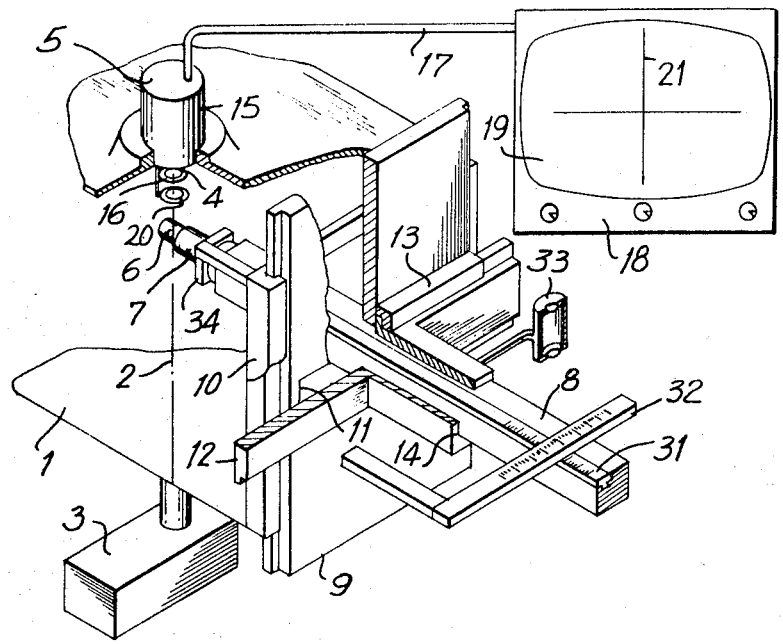
FIG. 1 is a perspective view of a closed-circuit TV inspection X-ray microscope, with a cut-away view of its specimen chamber according to the invention.

In FIG. 1, there is shown a closed-circuit TV inspection X-ray microscope comprising a specimen chamber 1 enclosing a specimen 6 placed on axis 2 of the X-ray beam emerging from an X-ray source 3 located in front of an X-ray sensitive TV pick-up tube 4 built into the case of a TV camera 5.

The specimen 6 is clamped in a grip 7 of a manipulator 8. Wall 9 of the specimen chamber 1 is movable and can be actuated to move in parallel with the axis 2 of the X-ray beam in the grooves of guides 10 by means of a manual control or by an electric operating mechanism (not shown in FIG. 1). The wall 9 is longer than the opening it covers by an amount equal to its maximum travel. The movable wall 9 has a rectangular opening 11 covered by a movable slab 12 which can be advanced in the grooves of guides 13 by, for example, a screw mechanism (not shown in FIG. 1). The slab 12 is longer than the opening 11 by an amount equal to its maximum travel. In the middle, the movable slab 12 has an opening 14 which together with the opening 11 in the wall 9, admits to the inside of the specimen chamber 1 the manipulator one end of which carries the grip 7, while the other end carries a number of controls (not shown in FIG. 1) to vary the orientation of the specimen 6 relative to the axis 2 of the X-ray beam.

The TV camera 5, whose case encloses the X-ray sensitive TV pick-up tube 4, has a focusing and a deflection system with a preamplifier (not shown in FIG. 1) and is built into a cylindrical jacket 15 and set up so that the center of target 16 in the X-ray sensitive TV pick-up tube 4 is on the axis 2 of the X-ray beam. The TV camera 5 is connected by a cable 17 to a TV monitor 18 having a screen 19. Located in front of the target 16 of the TV pick-up tube 4 is a cross-hair sight 20 made from a material absorbing X-rays and producing a sharp shadow image 21 on the screen 19 of the monitor 18. As an alternative, the cross-hair sight 20 may be drawn directly on the target 16.

Figure 2:
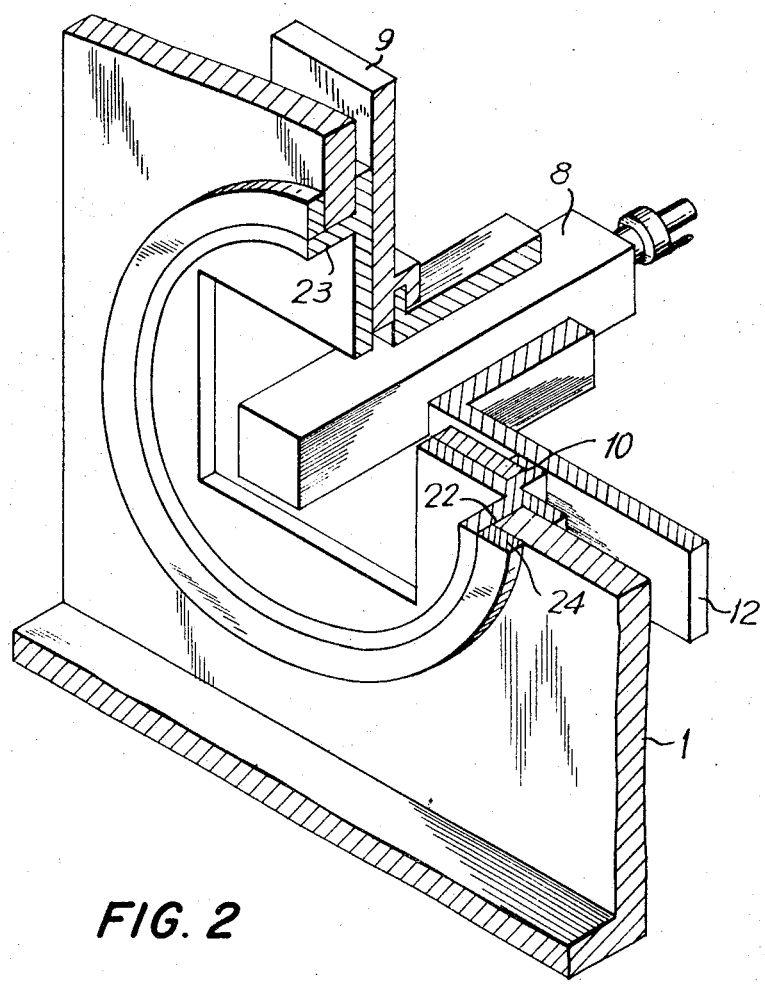
FIG. 2 shows one form of a movable wall for the specimen chamber, according to the invention.

FIG. 2 shows another form of the wall 9 in the specimen chamber 1, capable not only of moving to and fro, but also of rotating in its plane.

For this purpose, there is a round locating recess 22 in the specimen chamber 1, and the movable wall 8 has a tubular cylindrical trunnion 23 fitting into the recess 22 and locked there by a ring 24.

Figure 3:
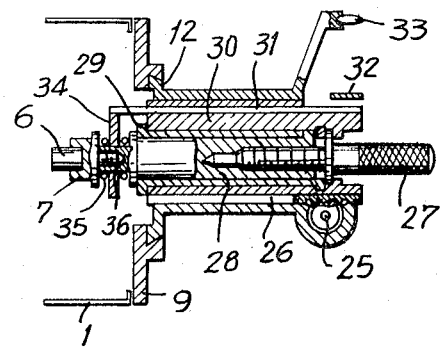
FIG. 3 is a cross-sectional view through the movable wall of the specimen chamber together with a specimen manipulator, according to the invention.

Course movement of the specimen 6 along the axis of the manipulator 8 (at right angles to the axis of the X-ray beam) is accomplished by a rack 26 and a pinion 25 (FIG. 3). Fine movement of the specimen is controlled by a lead screw 27 and a lead nut 28. Rotation of the specimen 6 together with the manipulator 8 is accomplished owing to the rotation of a hollow shaft 29 in the bore of housing 30 of the manipulator 8.

In a longitudinal groove in the housing 30 of the manipulator 8 there is mounted a mirror scale 31, and a transparent scale 32 is attached to the movable wall 9.

An optical scale-reading device 33 is mounted on the slab 12.

Single-valued relationship between the linear displacements of the specimen 6 as it is manipulated and the mirror scale 31 is secured by a washer 34 permanently attached to the scale 31. Axial play of the scale 31 is eliminated by two thrust ball bearings 35 located on the journal 36 of the manipulator and clamped in axial direction by the grip 7.

In using the closed-circuit TV inspection X-ray microscope disclosed herein, the operator adjusts the controls of the manipulator 8 (FIG. 1) to maneuver the specimen 6 into the requisite attitude while watching its actual position through a window (not shown in FIG. 1) in the specimen chamber 1, and details of its inner structure on the screen 19 of the monitor 18.

By operating the slab 12 and the manipulator 8, the specimen can be moved to and fro in two mutually perpendicular directions in a plane at right angles to the axis 2 of the X-ray beam.

The movable wall 9 makes it possible to position the specimen 6 together with the manipulator 8 on the axis 2 of the X-ray beam and relative to the target 16 of the TV pick-up tube 4 so that a well-defined outline of the specimen image appears on the screen 19. On having chosen the requisite position for the specimen 6 and watching its internal structure, the operator brings the outlines of the details being observed under the respective lines on the image 21 of the crosshair sight 20. Then, using the optical scale-reading device 33, he reads the coordinates determining the distance between the details of interest on the scales 31 and 32.

The closed-circuit TV inspection X-ray microscope disclosed herein offers the following advantages:

a. a specimen can be maneuvered into any position relative to the axis of the X-ray beam;

b. the specimen can be moved along two mutually perpendicular coordinate axes in a plane at right angles to the axis of the X-ray beam or in a plane making a predetermined angle with the axis of the X-ray beam.

What is claimed is:

1. A closed-circuit TV inspection X-ray microscope comprising a shielded specimen chamber for accommodating an object to be inspected, an X-ray source for producing an X-ray beam having a fixed axis with respect to said chamber, said X-ray beam entering said specimen chamber for producing an X-ray shadow image of the object, an X-ray sensitive TV pick-up tube positioned on said axis to receive said image and convert the same into a video-signal, a TV monitor connected with said pick-up tube and having a screen on which the image of the inner structure of the object can be displayed, means for moving the object inside said specimen chamber along three mutually perpendicular coordinates, said means including a wall which bounds said chamber and encloses the same and which is movable in its own plane parallel to said axis of the X-ray beam, plate means on said wall which is movable in a direction perpendicular to the movement of said wall, a rod passing through said plate means into said specimen chamber, said rod being provided at the end thereof extending into said chamber with a grip means to fix the object thereat, and control means at the opposite end of the rod remaining outside said chamber for moving said rod into and out of said chamber in a direction perpendicular to the axis of the X-ray beam.

2. A closed-circuit TV inspection X-ray microscope as claimed in claim 1 wherein said rod comprises two parts, one of which carries said grip means fixed thereon, said parts being coaxially mounted for relative movement by said control means, said control means comprising fine-adjustment means for said parts of the rod and rough-adjustment means for said rod.

3. A closed-circuit TV inspection X-ray microscope as claimed in claim 1 comprising means for rotating the means which moves the object around an axis perpendicular to the axis of the X-ray beam, whereby the orientation of the plane of coordinate movements of the object changes with respect to said axis of the X-ray beam.

4. A closed-circuit TV inspection X-ray microscope as claimed in claim 1 comprising two scales arranged parallel to the coordinate movements of the object to measure said movements, one of said scales being on said rod to move together therewith and the other being transparent and affixed to said wall, and an optical scale-reading device permanently attached to said plate means so that both said scales are simultaneously in the field of vision thereof.

5. A closed-circuit TV inspection X-ray microscope as claimed in claim 1 comprising means for producing on the screen of said monitor an image of two mutually perpendicular and independently movable cross-hair lines and means for bringing the center of said crosshairs to the axis of the X-ray beam falling on the target of said pick-up tube.

* * * * *